US006805608B2

(12) United States Patent
Forbes et al.

(10) Patent No.: US 6,805,608 B2
(45) Date of Patent: Oct. 19, 2004

(54) DIRECTIONALLY ADJUSTABLE TURKEY PAN CALL

(75) Inventors: David R. Forbes, Cedar Rapids, IA (US); Carman S. Forbes, Cedar Rapids, IA (US); Ron M. Bean, Cedar Rapids, IA (US)

(73) Assignee: Hunter's Specialties, Inc., Cedar Rapids, IA (US)

( * ) Notice: Subject to any disclaimer, the term of this patent is extended or adjusted under 35 U.S.C. 154(b) by 0 days.

(21) Appl. No.: 10/604,377

(22) Filed: Jul. 15, 2003

(65) Prior Publication Data

US 2004/0106351 A1 Jun. 3, 2004

Related U.S. Application Data

(62) Division of application No. 09/682,058, filed on Jul. 16, 2001, now Pat. No. 6,616,504.

(51) Int. Cl.[7] .................................................. A63H 5/00
(52) U.S. Cl. ........................... 446/397; 446/418; 84/402
(58) Field of Search ................................ 446/188, 397, 446/418, 421, 213–216, 199, 207–209; 84/402, 377, 378

(56) References Cited

U.S. PATENT DOCUMENTS

| 2,338,816 | A | * | 1/1944 | Lockhart .................. 84/411 R |
| 4,387,531 | A | * | 6/1983 | Jacob .......................... 446/397 |
| 4,586,912 | A | * | 5/1986 | Adams ........................ 446/397 |
| 4,662,858 | A | * | 5/1987 | Hall ............................ 446/397 |
| 4,733,808 | A | | 3/1988 | Turner, Jr. et al. |
| 4,821,932 | A | | 4/1989 | Petryshyn |
| 5,244,430 | A | | 9/1993 | Legursky |
| 5,562,521 | A | * | 10/1996 | Butler et al. ................ 446/397 |
| 5,607,091 | A | * | 3/1997 | Musacchia .................. 224/222 |
| 6,095,888 | A | * | 8/2000 | Panepinto ................... 446/397 |
| 6,443,803 | B1 | * | 9/2002 | Epple, Jr. .................... 446/418 |
| 6,676,479 | B1 | * | 1/2004 | Zimmerman ................ 446/397 |

* cited by examiner

Primary Examiner—Derris H. Banks
Assistant Examiner—Bena Miller
(74) Attorney, Agent, or Firm—Simmons, Perrine, Albright & Ellwood, P.L.C.

(57) ABSTRACT

A system and method for generating game sounds in a directionally adjustable manner which includes a friction pan call having a plurality of holes on generally opposing sides of a sound chamber wall, and a method whereby holes are successively closed in an incremental rotating manner around the call so as to help to create a sound emulating a moving sound source.

20 Claims, 1 Drawing Sheet

DIRECTIONALLY ADJUSTABLE TURKEY PAN CALL

CROSS REFERENCE TO RELATED APPLICATIONS

This application is a divisional of application Ser. No. 09/682,058 filed on Jul. 16, 2001, now U.S. Pat. No. 6,616,504 entitled "DIRECTIONALLY ADJUSTABLE TURKEY PAN CALL", by the same inventors, which application is incorporated herein in its entirety by this reference.

BACKGROUND OF INVENTION

For years, the typical turkey pan call has been a circular friction call with a circular playing surface disposed above a generally cylindrical sound chamber with at least one hole in the bottom from where sound propagates. While these bottom-holed turkey friction pan calls have been used extensively in the past, they do have some drawbacks. First of all, the hunter often rests the call on the hunter's leg. This tends to attenuate the sound produced by the call. Secondly, a hunter often wants to project the sound in a particular direction. To do this, the hunter would need to tip the call on its side and point the bottom of the call in the desired direction. This makes it difficult to play, because the top playing surface is then vertical.

U.S. Pat. No. 4,387,531 is an example of a call which does not have bottom holes used for sound emission. It does have an open bottom side, but it teaches placing this angled edge against the caller's body for support. The sound is emitted from two holes in the cylinder walls. This call is capable of emitting sound in a side direction, but it does not have the capability for easily changing the direction of the sound emission over a wide range of directions. Because of the slanted bottom opening, it is difficult to change the direction of emission by 45 degrees, 90 degrees, and 180 degrees.

Consequently, there exists a need for improved methods and systems for generating and directionally emitting sounds from a turkey friction pan call in an efficient manner.

SUMMARY OF INVENTION

It is an object of the present invention to provide a system and method for direction emission of sound from a turkey friction pan call in an efficient manner.

It is a feature of the present invention to utilize a plurality of sound emitting holes on opposing sides of a generally cylindrical sound chamber.

It is another feature of the present invention to include a plurality of opposing pairs of holes on opposing sides of the call.

It is an advantage of the present invention to achieve improved efficiency, making a full range of sound propagation directions.

The present invention is an apparatus and method for providing directionally adjustable sound emission from a turkey friction pan call, designed to satisfy the aforementioned needs, provide the previously stated objects, include the above-listed features, and achieve the already articulated advantages. The present invention is carried out in a "wasted motion-less" manner in a sense that motion of the call and the caller's hands to achieve a wide range of directional sound motion has been greatly reduced.

Accordingly, the present invention is a system and method including a turkey friction call with a plurality of holes disposed on generally opposite sides of a sound chamber of a turkey friction pan call.

BRIEF DESCRIPTION OF DRAWINGS

The invention may be more fully understood by reading the following description of the preferred embodiments of the invention, in conjunction with the appended drawings wherein.

DETAILED DESCRIPTION

Figure 1:
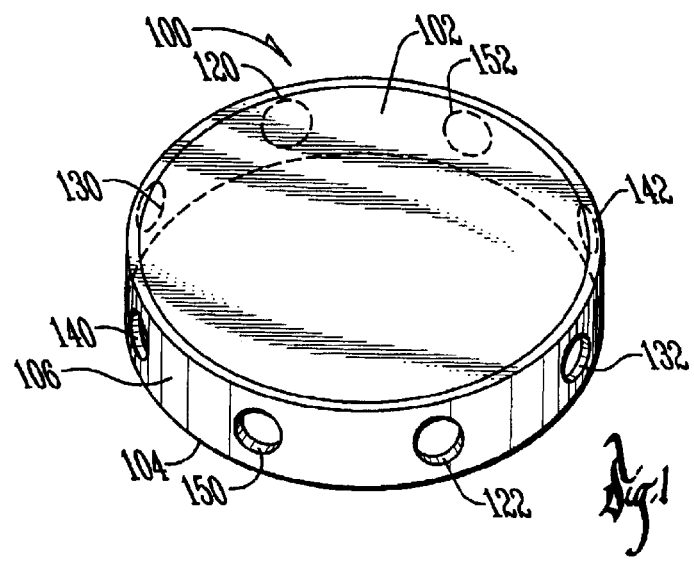
FIG. 1 is a perspective view of a turkey friction pan call of the present invention.

Now referring to the drawings wherein like numerals refer to like matter throughout, and more specifically referring to FIG. 1, there is shown a call of the present invention generally designated 100, including a top playing surface 102 which can be any shape but a circular shape is believed to be preferred. The top playing surface is generally disposed during normal use facing upward. Bottom side 104 is on an opposite side of the call 100 from the top side 102. Top side 102, bottom side 104 and sound chamber cylinder wall 106 together form a resonant sound chamber. The prior art calls typically would have holes in the bottom side 104 through which the sound can exit. FIG. 1 shows a plurality of holes 120,122, 130, 132, 140, 142, 150 and 152 in the sound chamber cylinder wall 106. Holes 120 and 122 are disposed approximately 180 degrees apart as measured around the circumference of the pan call 100. Holes 120 and 122 need not be exactly 180 degrees apart, but if hole 120 is pointed generally in a northerly direction in the field, then hole 122 would be generally in a southerly direction. Similarly, hole pairs 130–132, 140–142, and 150–152 are on generally opposing sides of the call 102. In a preferred embodiment of the present invention, it would be preferred to have at least eight holes disposed around the sound chamber cylinder walls.

Figure 2:
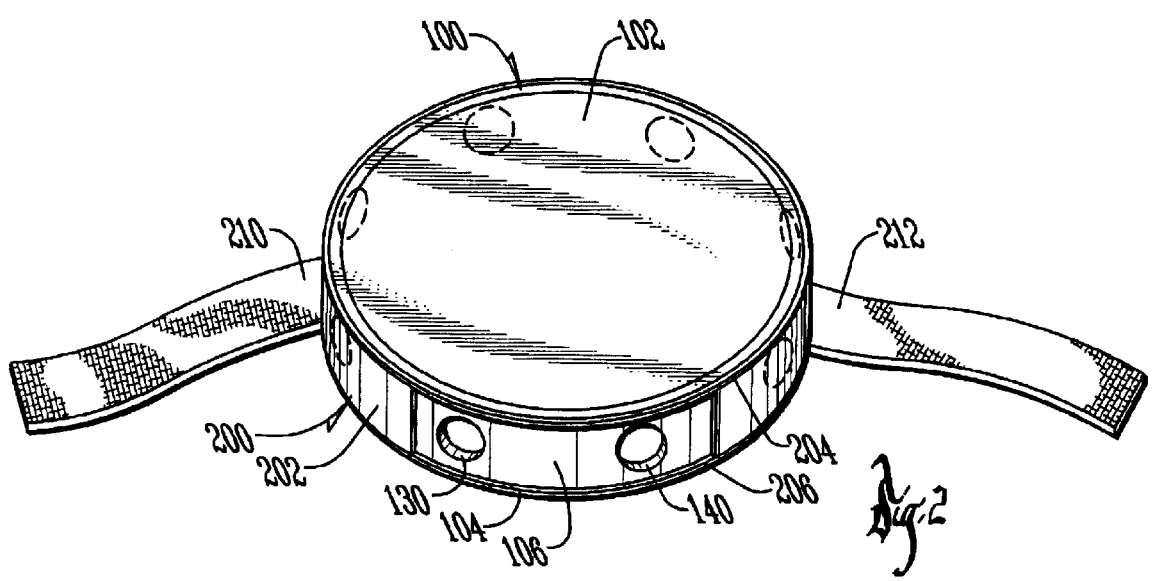
FIG. 2 is a perspective view of a turkey friction pan call of the present invention which includes a "C"-shaped sound blocking ring disposed on the call.

Now referring to FIG. 2, there is shown an alternate embodiment of the present invention, which includes a "C"-shaped sound blocking ring 202 disposed around the sound chamber cylinder wall 106. Sound blocking ring 202 preferably can be rotated around the call 100 to select the holes which are blocked and the holes which are left open for sound emission. Sound blocking ring 202 can be a resilient member which merely clips around the sound chamber cylinder wall 106, and it may be disposed between top and bottom circular ridges 204 and 206 respectively. Sound blocking ring 202 may be sufficiently resilient so that a gripping bias force is applied to the sound chamber side wall when the sound ring is disposed thereon.

FIG. 2 also shows a first strap 210 and a second strap 212, which are preferably adapted and configured using Velcro to adhere to each other. Other means of attaching the call 200 to an arm or a leg are envisioned as well, such as buckles, snaps, strings, elastic bands etc.

In operation, the apparatus of the present invention as described in FIG. 1 could function as follows:

The hunter or caller (note: this call could be used by persons other than hunters) holds the call 100 in the palm of one hand. A striker is held in the other hand, and the call is operated in a well-known manner. If none of the holes 120, 122, 130, 132, 140, 142, 150 and 152 are blocked by the caller's hand, then the sound emitted by the call will be omni-directional. However, if the caller wishes the sound to go only in one direction, then the caller need only grasp the call, so that the caller's hands and fingers cover the holes oriented in a direction other than the desired direction of sound propagation.

At times, a caller may want to make a sound of a turkey walking in a large circle pattern. With the aid of the present invention, the caller can grasp the call 100 or even rest the call on the caller's leg, lap or even strap it to a leg or even the caller's arm (or a sleeve disposed around the caller's arm) if sound blocking ring 202 is used. The caller can then make a series of calls or sounds using a striker in the well-known manner, the difference being that the caller may block all but one or two of the holes during the sound generation. With each successive generation of a sound, the caller can switch the open holes to an adjacent hole. This is done by either covering the holes with the fingers or by rotating the sound blocking ring 202. The process is repeated until the sound has been emitted over a wide range of direction, at least 180 degrees. This is all done without any need to move the call itself. More particularly, if a caller first covered all holes except hole 120, then made a sound with the call, then covered all holes except 130 and then made a sound with the call, then the caller covered all holes except 140 and made a sound with the call, it would sound as if the turkey were walking in a counter clockwise direction.

Throughout this description, reference is made to a turkey pan call because it is believed that the beneficial aspects of the present invention would be most readily apparent when used as a turkey call; however, it should be understood that the present invention is not intended to be limited to turkey calls and should be hereby construed to include other non-turkey calls as well.

It is thought that the method and apparatus of the present invention will be understood from the foregoing description and that it will be apparent that various changes may be made in the form, construct steps, and arrangement of the parts and steps thereof, without departing from the spirit and scope of the invention or sacrificing all of their material advantages. The form herein described is merely a preferred exemplary embodiment thereof.

What is claimed is:

1. An improved friction pan game call of the type comprising:
   a smooth top planar playing surface, which is configured to generate sounds which emulate sounds of animals when a striker is placed and maintained in contact with said top planar playing surface and is moved across said smooth top planar playing surface;
   a sound chamber side wall coupled to said smooth top planar playing surface and substantially perpendicular thereto, said sound chamber side wall having a first sound emitting hole therein at a first location;
   said sound chamber side wall having a second sound emitting hole therein at a second location; and,
   wherein said first location and said second location are on opposing sides of said friction pan call.

2. A call of claim 1 wherein said smooth top playing surface is a circular shaped playing surface.

3. A call of claim 2 wherein said first location and said second location are substantially 180 degrees apart as measured around said circular shaped playing surface.

4. A call of claim 3 further comprising a third sound emitting hole disposed between said first sound emitting hole and said second sound emitting hole.

5. A call of claim 4 further comprising a fourth sound emitting hole disposed between said first sound emitting hole and said third sound emitting hole.

6. A call of claim 5 further comprising a movable sound blocking structure disposed on said sound chamber side wall, so that sound may be selectively obstructed from exiting through an orifice in said sound chamber side wall.

7. A call of claim 6 wherein said sound blocking structure is a sound blocking ring, having a "C" shape.

8. A call of claim 7 further comprising a bottom surface opposing said smooth top playing surface.

9. A call of claim 8 where said sound blocking ring is disposed between a first circular sound blocking ring retaining ridge and a second circular sound blocking ring retaining ridge.

10. A call of claim 7 wherein said sound blocking ring is a resilient member which applies a gripping bias force on sound chamber side wall.

11. A game call comprising:
    a top smooth circular planar sound generating surface, which is configured to generate sounds which emulate sounds made by an animal, when a striker is dragged across said top smooth circular planar sound generating surface;
    a side wall, having a substantially cylindrical shape, coupled to said top smooth circular planar sound generating surface;
    a plurality of sound emitting holes in said side wall, for sound to escape therethrough; and,
    at least two of said plurality of sound emitting holes defining a pair of holes on opposite sides of said side wall.

12. A game call of claim 11 further comprising:
    means for strapping said sidewall around an object.

13. A game call of claim 12 wherein:
    said means for strapping includes a first strap, a second strap and means for detachably coupling two straps to each other.

14. A game call of claim 13 further comprising:
    a sound blocking ring having a void therein, which sound blocking ring is disposed on said side wall and is configured to rotate around said side wall and selectively occlude one of said plurality of sound emitting holes while simultaneously permitting sound to exit through another of said plurality of sound emitting holes when in alignment with said void.

15. An apparatus for calling game comprising:
    means for generating sounds which emulate a sound made by an animal when contacted by a stylus;
    means for maintaining resonance of sound generated by said stylus; and
    a pair of directionally opposing means for emitting sound from said means for maintaining resonance of sound, such that a propagation direction of sound emitted can be reversed without changing a positional orientation of said means for generating and said means for maintaining.

16. An apparatus of claim 15 wherein said means for generating is a circular plate.

17. An apparatus of claim 16 wherein said means for maintaining resonance is a cup disposed beneath said circular plate.

18. An apparatus of claim 17 further comprising means for coupling said cup to a human limb.

19. An apparatus of claim 18 further comprising a means for covering and holes in said cup by a rotational motion.

20. An apparatus of claim 19 wherein said cup has a bottom surface with no sound emitting ports therein.

* * * * *

UNITED STATES PATENT AND TRADEMARK OFFICE
CERTIFICATE OF CORRECTION

PATENT NO. : 6,805,608 B2
DATED : October 19, 2004
INVENTOR(S) : David R. Forbes, Carman S. Forbes and Ron M. Bean It is certified that error appears in the above-identified patent and that said Letters Patent is hereby corrected as shown below:

Title page,
Item [56], References Cited, U.S. PATENT DOCUMENTS, please add the following references:
-- 4,269,104    5/1981    Cantos, Jr.
   5,716,254    2/1998    Bowes --

Column 1,
Line 18, please insert a new paragraph after the word "propagates".

Column 4,
Line 63, after the word "and", please insert -- uncovering --.

Signed and Sealed this

First Day of February, 2005

JON W. DUDAS
*Director of the United States Patent and Trademark Office*